US012684367B2

(12) United States Patent
Nakahira et al.

(10) Patent No.: US 12,684,367 B2
(45) Date of Patent: Jul. 14, 2026

(54) BASE STATION DISPOSITION SELECTING METHOD, BASE STATION DISPOSITION SELECTING APPARATUS AND PROGRAM

(71) Applicant: NTT, Inc., Tokyo (JP)

(72) Inventors: Toshiro Nakahira, Tokyo (JP); Motoharu Sasaki, Tokyo (JP); Daisuke Murayama, Tokyo (JP); Shota Nakayama, Tokyo (JP); Takatsune Moriyama, Tokyo (JP); Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 298 days.

(21) Appl. No.: 18/579,005

(22) PCT Filed: Aug. 18, 2021

(86) PCT No.: PCT/JP2021/030204
§ 371 (c)(1),
(2) Date: Jan. 12, 2024

(87) PCT Pub. No.: WO2023/021616
PCT Pub. Date: Feb. 23, 2023

(65) Prior Publication Data
US 2024/0323700 A1 Sep. 26, 2024

(51) Int. Cl.
H04W 16/18 (2009.01)
H04B 17/318 (2015.01)

(52) U.S. Cl.
CPC .......... H04W 16/18 (2013.01); H04B 17/318 (2015.01)

(58) Field of Classification Search
CPC ............................. H04W 16/18; H04B 17/318
See application file for complete search history.

(56) References Cited

U.S. PATENT DOCUMENTS

| | | | |
|---|---|---|---|
| 9,185,664 B2 | 11/2015 | Park et al. | |
| 9,572,110 B1 | 2/2017 | Serfaty et al. | |
| 10,355,835 B2 | 7/2019 | Oyama | |
| 2004/0131029 A1 | 7/2004 | Tobe et al. | |

(Continued)

FOREIGN PATENT DOCUMENTS

JP 2018-195928 12/2018

OTHER PUBLICATIONS

Takuto Arai, Daisuke Goto, Masashi Iwabuchi, Tatsuhiko Iwakuni, Kazuki Maruta, "Adaptive Movable Access Point System for Offloading Efficiency Enhancement," IEICE technical report, vol. 116 No. 46, RCS2016-43, pp. 107 to 112, May 2016.

(Continued)

*Primary Examiner* — Sharmin Chowdhury
(74) *Attorney, Agent, or Firm* — IPUSA, PLLC

(57) ABSTRACT

A base station deployment position selection method executed by a computer includes calculating, in an area where a first base station to which a plurality of terminals are connected is deployed, for each of a plurality of candidates for a deployment position of a second base station, in a case where the second base station is deployed at the deployment position being a candidate, a number of first terminals connected to the first base station and a number of second terminals connected to the second base station; and selecting one candidate from the plurality of candidates based on the number of first terminals and the number of second terminals.

3 Claims, 15 Drawing Sheets

(56) References Cited

U.S. PATENT DOCUMENTS

| | | | |
|---|---|---|---|
| 2006/0138224 A1 | 6/2006 | Azami et al. | |
| 2011/0143806 A1 | 6/2011 | Song et al. | |
| 2012/0127878 A1 | 5/2012 | Kim et al. | |
| 2013/0065633 A1 | 3/2013 | Sridhara et al. | |
| 2013/0082878 A1 | 4/2013 | Jarvis et al. | |
| 2013/0252604 A1 | 9/2013 | Huber et al. | |
| 2014/0018084 A1 | 1/2014 | Sato et al. | |
| 2014/0162686 A1 | 6/2014 | Lee et al. | |
| 2015/0117183 A1 | 4/2015 | Heo et al. | |
| 2015/0124720 A1 | 5/2015 | Morimoto et al. | |
| 2015/0146638 A1 | 5/2015 | Ohwatari et al. | |
| 2015/0156640 A1* | 6/2015 | Nguyen | H04W 16/18 |
| | | | 455/422.1 |
| 2015/0280888 A1 | 10/2015 | Karsi et al. | |
| 2016/0308635 A1 | 10/2016 | Zhou et al. | |
| 2017/0245287 A1 | 8/2017 | Lee et al. | |
| 2017/0303209 A1 | 10/2017 | Na | |
| 2018/0184303 A1* | 6/2018 | Egner | H04W 24/02 |
| 2019/0281500 A1 | 9/2019 | Cummings | |
| 2021/0226650 A1 | 7/2021 | Zhao et al. | |
| 2023/0189169 A1 | 6/2023 | Vivanco et al. | |
| 2024/0323864 A1 | 9/2024 | Nakahira et al. | |

OTHER PUBLICATIONS

Wi-fi Alliance, https://www.wi-fi.org/ja/discover-wi-fi/wi-fi-location, Searched on Dec. 25, 2023.
Notice of Allowance mailed on Mar. 3, 2026 with respect to the related U.S. Appl. No. 18/683,401.

* cited by examiner

Fig. 1

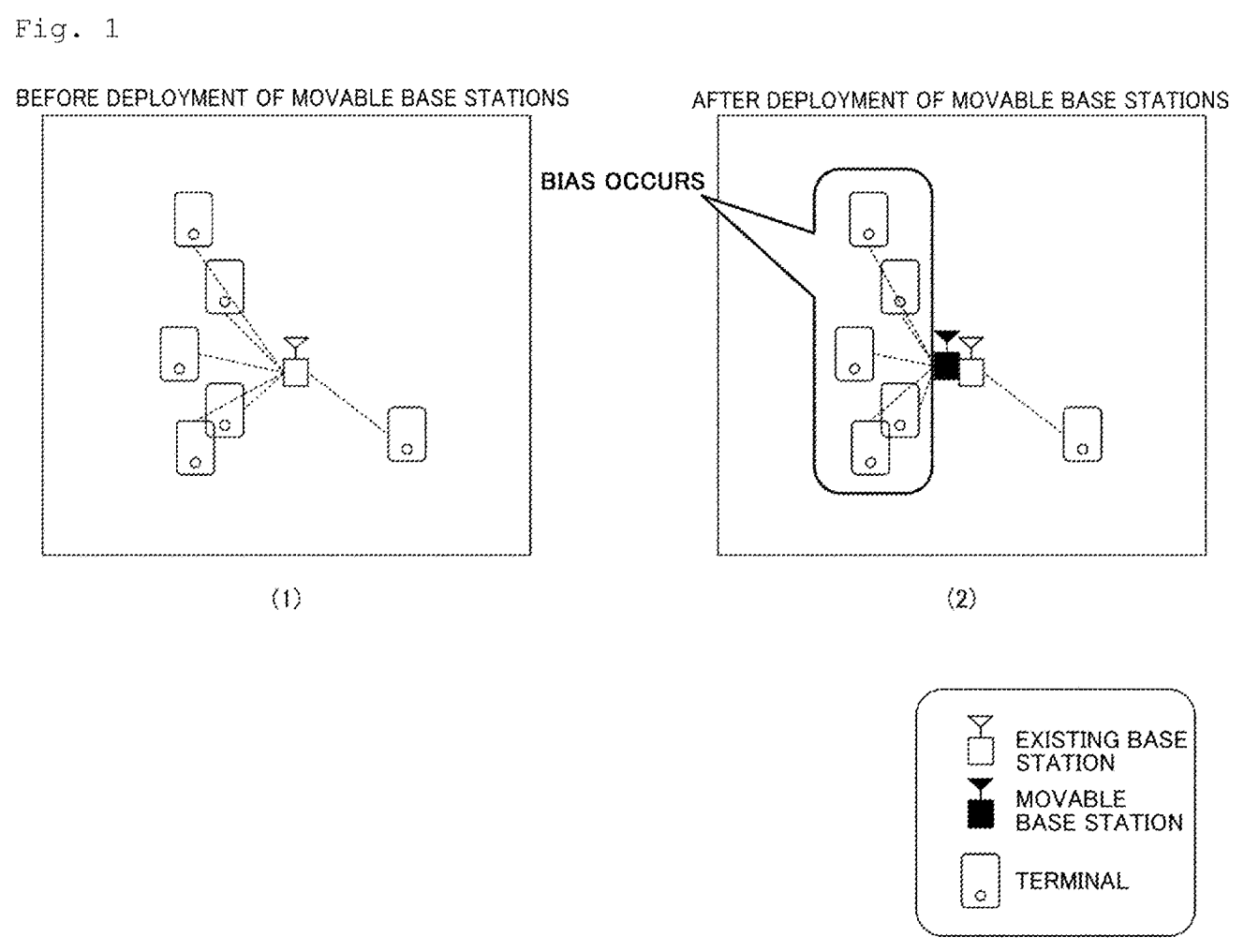

BEFORE DEPLOYMENT OF MOVABLE BASE STATIONS (1)

AFTER DEPLOYMENT OF MOVABLE BASE STATIONS (2)

BIAS OCCURS

EXISTING BASE STATION

MOVABLE BASE STATION

TERMINAL

Fig. 6
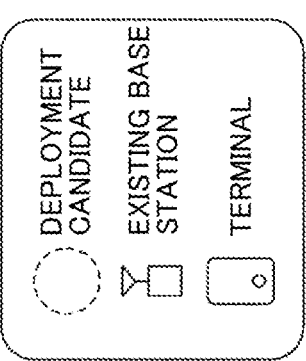
DEPLOYMENT CANDIDATE
EXISTING BASE STATION
TERMINAL
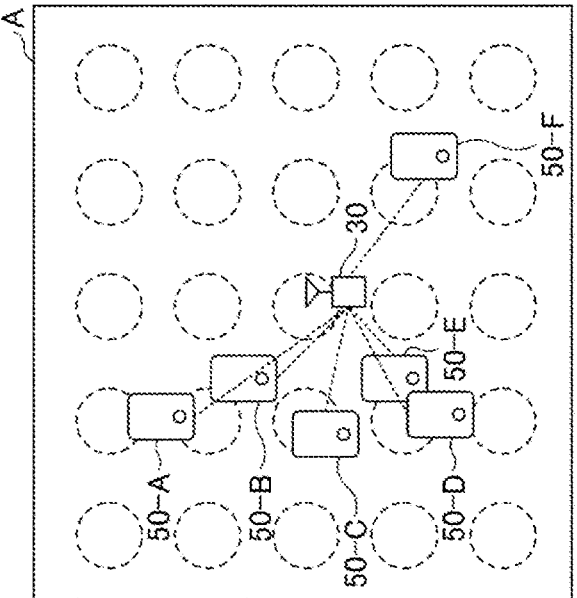

Fig. 7

| DEPLOYMENT CANDIDATE NUMBER | (a) NUMBER OF TERMINALS CONNECTED TO EXISTING BASE STATION | (b) NUMBER OF TERMINALS CONNECTED TO MOVABLE BASE STATION | (c) TERMINAL OF WHICH CONNECTED TO BASE STATION IS UNALLOWED (PRESENCE: 0, ABSENCE: 1) | EVALUATION VALUE X |
|---|---|---|---|---|
| 1 | 2 | 4 | 1 | 8 |
| 2 | 2 | 4 | 1 | 8 |
| 3 | 2 | 4 | 1 | 8 |
| ... | ... | ... | ... | ... |
| 6 | 3 | 3 | 1 | 9 |
| 7 | 3 | 3 | 1 | 9 |
| ... | ... | ... | ... | ... |
| 25 | 5 | 1 | 1 | 5 |

Fig. 8

| DEPLOYMENT CANDIDATE NUMBER | (a) NUMBER OF TERMINALS CONNECTED TO EXISTING BASE STATION | (b) NUMBER OF TERMINALS CONNECTED TO MOVABLE BASE STATION | (c) TERMINAL OF WHICH CONNECTION TO BASE STATION IS UNALLOWED (PRESENCE: 0, ABSENCE: 1) | EVALUATION VALUE X | (d) MAXIMUM VALUE (m) OF DISTANCE BETWEEN EXISTING BASE STATION CONNECTION TERMINAL AND EXISTING BASE STATION | (e) MAXIMUM VALUE (m) OF DISTANCE BETWEEN MOVABLE BASE STATION CONNECTION TERMINAL AND MOVABLE BASE STATION | EVALUATION VALUE Y1 (m) | EVALUATION VALUE Y2 (m) |
|---|---|---|---|---|---|---|---|---|
| 1 | 2 | 4 | 1 | 8 | - | - | - | - |
| 2 | 2 | 4 | 1 | 8 | - | - | - | - |
| 3 | 2 | 4 | 1 | 8 | - | - | - | - |
| ... | ... | ... | ... | ... | ... | ... | ... | ... |
| 6 | 3 | 3 | 1 | 9 | 10 | 8 | 10 | 8 |
| 7 | 3 | 3 | 1 | 9 | 10 | 5 | 10 | 5 |
| ... | ... | ... | ... | ... | ... | ... | ... | ... |
| 25 | 5 | 1 | 1 | 5 | - | - | - | - |

Fig. 9
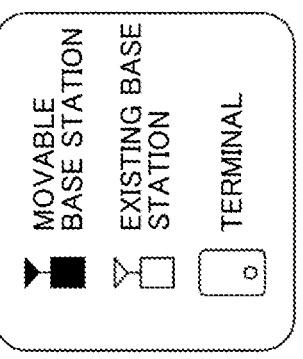
MOVABLE
BASE STATION
EXISTING BASE
STATION
TERMINAL
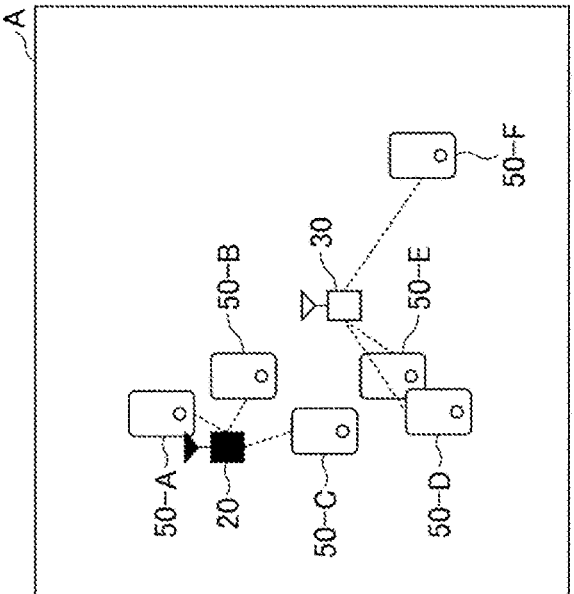

Fig. 11

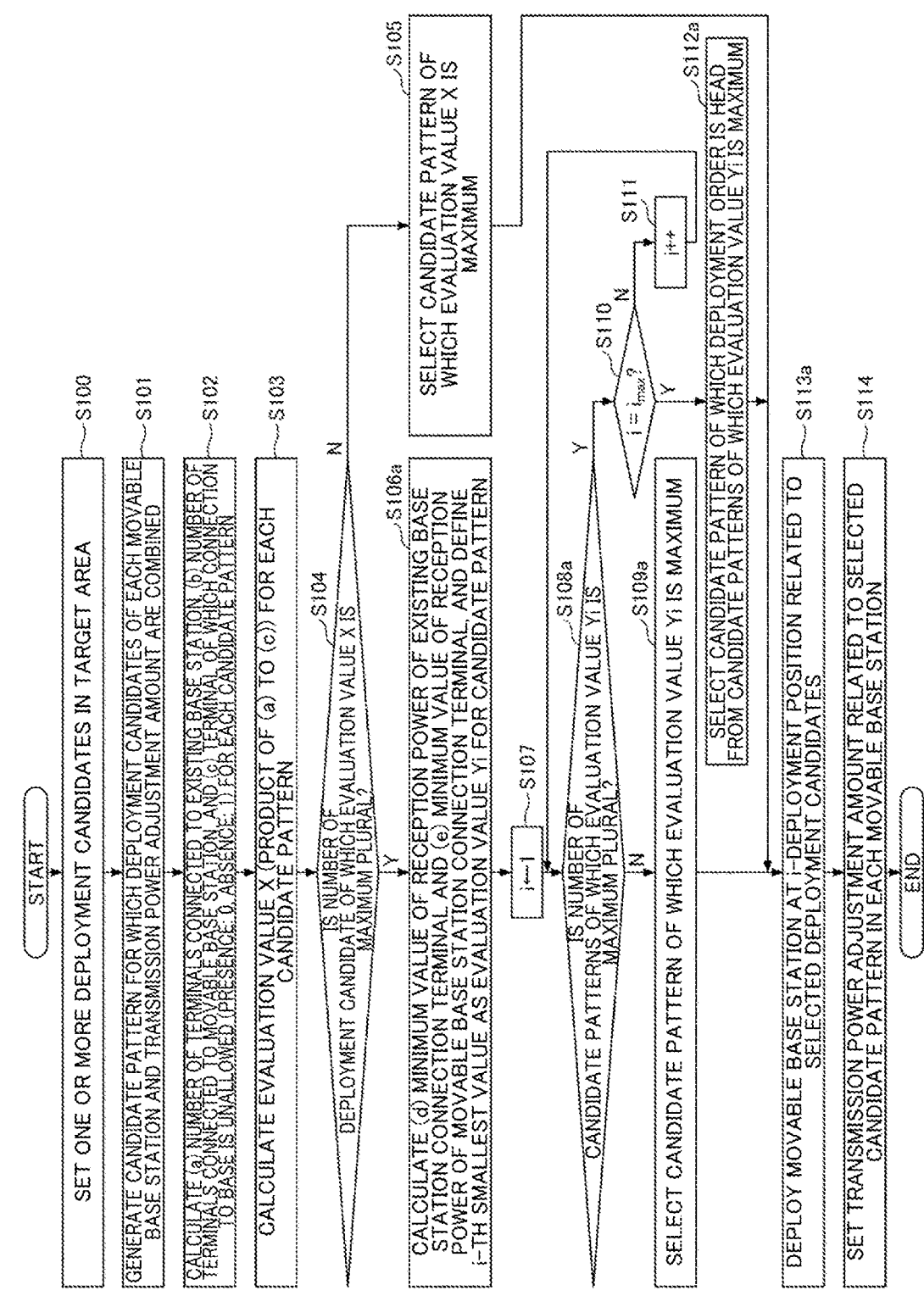

START

SET ONE OR MORE DEPLOYMENT CANDIDATES IN TARGET AREA — S100

GENERATE CANDIDATE PATTERN FOR WHICH DEPLOYMENT CANDIDATES OF EACH MOVABLE BASE STATION AND TRANSMISSION POWER ADJUSTMENT AMOUNT ARE COMBINED — S101

CALCULATE (a) NUMBER OF TERMINALS CONNECTED TO EXISTING BASE STATION, (b) NUMBER OF TERMINALS CONNECTED TO MOVABLE BASE STATION, AND (c) TERMINAL OF WHICH CONNECTION TO BASE IS UNALLOWED (PRESENCE: 0, ABSENCE: 1) FOR EACH CANDIDATE PATTERN — S102

CALCULATE EVALUATION VALUE X (PRODUCT OF (a) TO (c)) FOR EACH CANDIDATE PATTERN — S103

IS NUMBER OF DEPLOYMENT CANDIDATE OF WHICH EVALUATION VALUE X IS MAXIMUM PLURAL? — S104

N → SELECT CANDIDATE PATTERN OF WHICH EVALUATION VALUE X IS MAXIMUM — S105

Y

CALCULATE (d) MINIMUM VALUE OF RECEPTION POWER OF EXISTING BASE STATION CONNECTION TERMINAL AND (e) MINIMUM VALUE OF RECEPTION POWER OF MOVABLE BASE STATION CONNECTION TERMINAL, AND DEFINE i-TH SMALLEST VALUE AS EVALUATION VALUE Yi FOR CANDIDATE PATTERN — S106a i←1 — S107

IS NUMBER OF CANDIDATE PATTERNS OF WHICH EVALUATION VALUE Yi IS MAXIMUM PLURAL? — S108a

N → SELECT CANDIDATE PATTERN OF WHICH EVALUATION VALUE Yi IS MAXIMUM — S109a

Y i = i_max ? — S110

N → i++ — S111

Y → SELECT CANDIDATE PATTERN OF WHICH DEPLOYMENT ORDER IS HEAD FROM CANDIDATE PATTERNS OF WHICH EVALUATION VALUE Yi IS MAXIMUM — S112a

DEPLOY MOVABLE BASE STATION AT i-DEPLOYMENT POSITION RELATED TO SELECTED DEPLOYMENT CANDIDATES — S113a

SET TRANSMISSION POWER ADJUSTMENT AMOUNT RELATED TO SELECTED CANDIDATE PATTERN IN EACH MOVABLE BASE STATION — S114

END

Fig. 12

| CANDIDATE PATTERN NUMBER | DEPLOYMENT CANDIDATE STRING | TRANSMISSION POWER ADJUSTMENT AMOUNT STRING (−dB) |
|---|---|---|
| 1 | [1, 2] | [0, 0] |
| 2 | [1, 3] | [0, 0] |
| ... | ... | ... |
| 29 | [2, 7] | [0, 0] |
| ... | ... | ... |
| 300 | [24, 25] | [0, 0] |
| 301 | [1, 2] | [0, 3] |
| ... | ... | ... |

Fig. 13

| CANDIDATE PATTERN NUMBER | DEPLOYMENT CANDIDATE STRING | TRANSMISSION POWER ADJUSTMENT AMOUNT STRING (-dB) | (a) NUMBER OF TERMINALS CONNECTED TO EXISTING BASE STATION | (b) NUMBER OF TERMINALS CONNECTED TO MOVABLE BASE STATION | (c) TERMINAL OF WHICH CONNECTION TO BASE STATION CONNECTION IS UNALLOWED (PRESENCE: 0, ABSENCE: 1) | EVALUATION VALUE X |
|---|---|---|---|---|---|---|
| 1 | [1, 2] | [0, 0] | [3, 1] | [0, 2] | 1 | 0 |
| 2 | [1, 3] | [0, 0] | [4, 1] | [1, 0] | 1 | 0 |
| ... | ... | ... | ... | ... | ... | ... |
| 29 | [2, 7] | [0, 0] | [1, 2] | [2, 1] | 1 | 4 |
| ... | ... | ... | ... | ... | ... | ... |
| 300 | [24, 25] | [0, 0] | [5, 0] | [1, 0] | 1 | 0 |
| 301 | [1, 2] | [0, 3] | ... | ... | ... | ... |
| ... | ... | ... | ... | ... | ... | ... |

Fig. 14

| CANDIDATE PATTERN NUMBER | DEPLOYMENT CANDIDATE STRING | TRANSMISSION POWER ADJUSTMENT AMOUNT STRING (-dB) | (a) NUMBER OF TERMINALS CONNECTED TO EXISTING BASE STATION | (b) NUMBER OF TERMINALS CONNECTED TO MOVABLE BASE STATION | (c) TERMINAL OF WHICH CONNECTED TO BASE STATION IS UNALLOWED (PRESENCE: 0, ABSENCE: 1) | EVALUATION VALUE X | (d) MINIMUM VALUE (dBm) OF DISTANCE BETWEEN EXISTING BASE STATION CONNECTION TERMINAL AND EXISTING BASE STATION | (e) MINIMUM VALUE (dBm) OF DISTANCE BETWEEN MOVABLE BASE STATION CONNECTION TERMINAL AND MOVABLE BASE STATION | EVALUATION VALUE Y1 (dBm) | EVALUATION VALUE Y2 (dBm) |
|---|---|---|---|---|---|---|---|---|---|---|
| 1 | [1, 2] | [0, 0] | [3, 1] | [0, 2] | 1 | 0 | - | - | - | - |
| 2 | [1, 3] | [0, 0] | [4, 1] | [1, 0] | 1 | 0 | - | - | - | - |
| ... | ... | ... | ... | ... | ... | ... | ... | ... | ... | ... |
| 29 | [2, 7] | [0, 0] | [1, 2] | [2, 1] | 1 | 4 | [-50, -55] | [-65, -60] | -65 | -60 |
| ... | ... | ... | ... | ... | ... | ... | ... | ... | ... | ... |
| 300 | [24, 25] | [0, 0] | [5, 0] | [1, 0] | 1 | 0 | ... | ... | ... | ... |
| 301 | [1, 2] | [0, 3] | ... | ... | ... | ... | ... | ... | ... | ... |
| ... | ... | ... | ... | ... | ... | ... | ... | ... | ... | ... |

Fig. 15
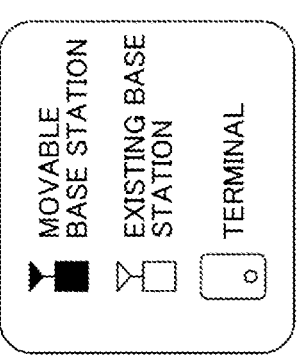
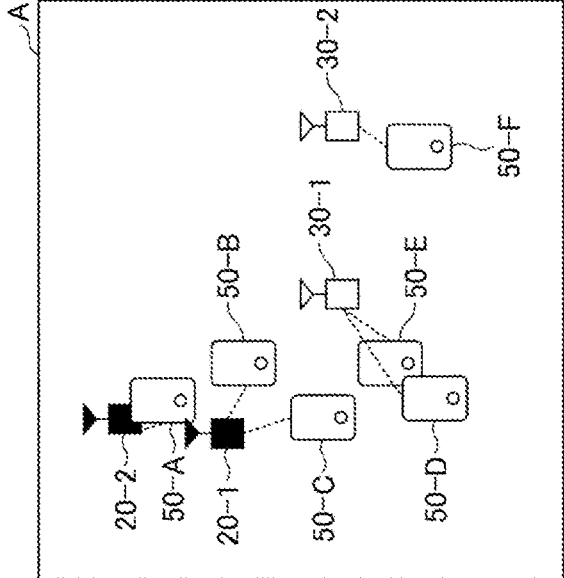

1

BASE STATION DISPOSITION SELECTING METHOD, BASE STATION DISPOSITION SELECTING APPARATUS AND PROGRAM

TECHNICAL FIELD

The present invention relates to a base station deployment position selection method, a base station deployment position selection apparatus, and a program.

BACKGROUND ART

When wireless base stations are deployed uniformly in an area in order to efficiently secure an area coverage, communication quality of a specific area may deteriorate due to the influence such as terminal congestion or shielding. On the other hand, a technology for ameliorating deterioration of the communication quality by dynamically deploying movable base stations in an area where the communication quality deteriorated has been studied (NPL 1).

CITATION LIST

Non Patent Literature

NPL 1: Takuto Arai, Daisuke Goto, Masashi Iwabuchi, Tatsuhiko Iwakuni, Kazuki Maruta, "Adaptive Movable Access Point System for Offloading Efficiency Enhancement," IEICE technical report, vol. 116 No. 46, RCS2016-43, pp. 107 to 112, May 2016

SUMMARY OF INVENTION

Technical Problem

However, when movable base stations are dynamically deployed and the reception power from a movable base station becomes too large compared with other base stations, many terminals autonomously connect to this movable base station, and thus an excessive bias in terminal connection occurs, resulting in a possibility of communication quality deteriorating.

FIG. 1 is a diagram illustrating a problem of a technology of the related art. In FIG. 1, an example is described in which one movable base station is additionally installed in an environment in which there are one existing base station and six terminals. (1) of FIG. 1 illustrates a state before the deployment of the movable base station and (2) of FIG. 1 illustrates a state after the deployment of the movable base station.

Since communication was congested when six terminals were connected to one existing base station before the deployment of the movable base station, congestion was eliminated or mitigated by deployment of this one movable base station.

In the technology of the related art, the result obtained by calculation for the deployment of the movable base station in a cluster of six terminals is that the movable base station is installed near the existing base station, for example, as illustrated in (2).

At this time, among the six terminals, five terminals are closer to the movable base station than to the existing base station. Accordingly, when the transmission powers of the existing base station and the movable base station are the same, the signal power received from the movable base station by the five terminals is greater than the signal power received from the existing base station.

When signals from a plurality of base stations can be received, connection of a terminal to a base station having the largest reception power is an operation in a general wireless system. Therefore, the five terminals are connected to the movable base station.

As a result, five terminals are connected to the movable base station, and one terminal is connected to the existing base station, and thus the number of terminals connected between the existing base station and the movable base station is biased.

The present invention has been devised in view of the foregoing circumstances and an object of the present invention is to reduce a bias of the number of terminals connected to each of the base stations.

Solution to Problem

In order to solve the foregoing problem, a computer performs a calculation procedure of calculating, in an area where a first base station to which a plurality of terminals are connected is deployed, for each of a plurality of candidates for a deployment position of a second base station, in a case where the second base station is deployed at the deployment position being a candidate, a number of first terminals connected to the first base station and a number of second terminals connected to the second base station; and a selection procedure of selecting one candidate from the plurality of candidates based on the number of first terminals and the number of second terminals.

Advantageous Effects of Invention

It is possible to reduce a bias of the number of terminals connected to respective base stations.

BRIEF DESCRIPTION OF DRAWINGS

FIG. 1 is a diagram illustrating a problem of a technology of the related art.

FIG. 6 is a diagram illustrating an example of deployment candidates.

FIG. 7 is a diagram illustrating an example of a calculation result of evaluation values X of respective deployment candidates according to the first embodiment.

FIG. 8 is a diagram illustrating an example of a calculation result of evaluation values Yi of respective deployment candidates according to the first embodiment.

FIG. 9 is a diagram illustrating an example of a state of terminals 50 connected to respective base stations according to the first embodiment.

FIG. 11 is a flowchart illustrating an example of a processing procedure performed by the control station 10 according to the second embodiment.

FIG. 12 is a diagram illustrating an example of a candidate pattern.

FIG. 13 is a diagram illustrating an example of calculation result of evaluation values X of respective candidate patterns according to the second embodiment.

FIG. 14 is a diagram illustrating an example of a calculation result of evaluation values Yi of respective candidate patterns according to the second embodiment.

FIG. 15 is a diagram illustrating an example of a state of terminals 50 connected to respective base stations according to the second embodiment.

DESCRIPTION OF EMBODIMENTS

Figure 2:
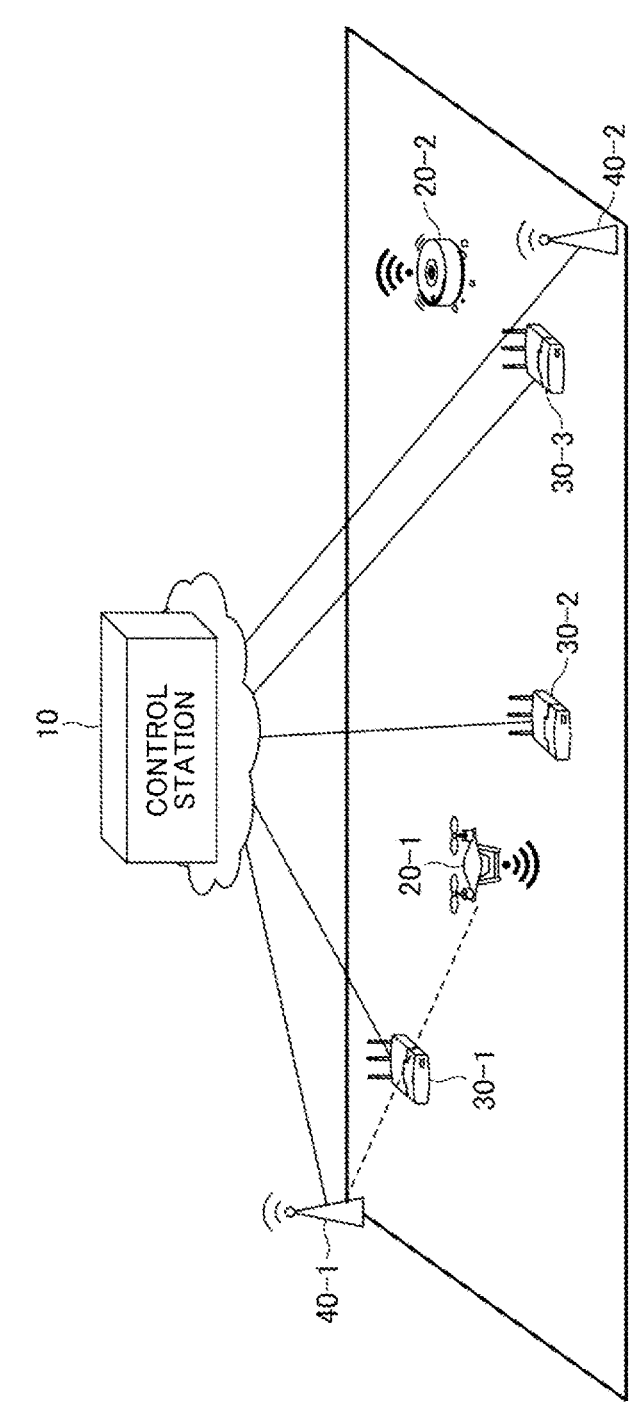
FIG. 2 is a diagram illustrating a configuration example of a communication system according to an embodiment of the present invention.

Embodiments of the present invention will be described below with reference to the drawings. FIG. 2 is a diagram illustrating a configuration example of a communication system according to an embodiment of the present invention. As illustrated in FIG. 2, the communication system 1 includes one or more existing base stations 30, one or more movable base stations 20, one or more relay base stations 40, and a control station 10. Note that the base station refers to a base station (access point) of wireless communication (for example, a wireless LAN).

The existing base station 30 is an existing base station according to the embodiment. In the embodiment, the existing base station 30 is not considered to be a movement target, but the existing base station 30 may be movable.

The movable base station 20 is a movable base station and is a base station which is newly deployed (of which a deployment position is not determined) in the embodiment. For example, when communication is congested in a certain existing base station 30, the movable base station 20 is dynamically deployed. Note that driving means for moving the movable base station 20 is not limited to specific means. For example, a vehicle, a drone, or the like may be the driving means. The movable base station 20 may be configured to move on a rail installed in advance.

The relay base station 40 is a base station that relays communication between the movable base station 20 and the control station 10. The relay base station 40 and the movable base stations 20 are connected by wireless communication. Accordingly, the movable base station 20 can move within a range in which wireless communication with the relay base station 40 is possible.

Note that, in the following description, when the existing base station 30 and the movable base station 20 are not distinguished from each other, the existing base station 30 and the movable base station 20 are simply referred to as "base stations." Although not illustrated in the drawing, there are a plurality of terminals (hereinafter, terminals 50) which perform communication through wireless connection to any of the base stations. Each terminal is connected to any base station under autonomous control. The autonomous control is, for example, control in which a terminal connects itself to a base station having relatively greater reception power for the terminal.

The control station 10 is one or more computers controlling deployment or the like of the movable base station 20. The control station 10 is connected to existing base stations 30 and relay base stations 40 via a network (in which wired or wireless communication does not matter), and can collect information regarding each base station and a terminal from each existing base station 30 and each relay base station 40.

Figure 3:
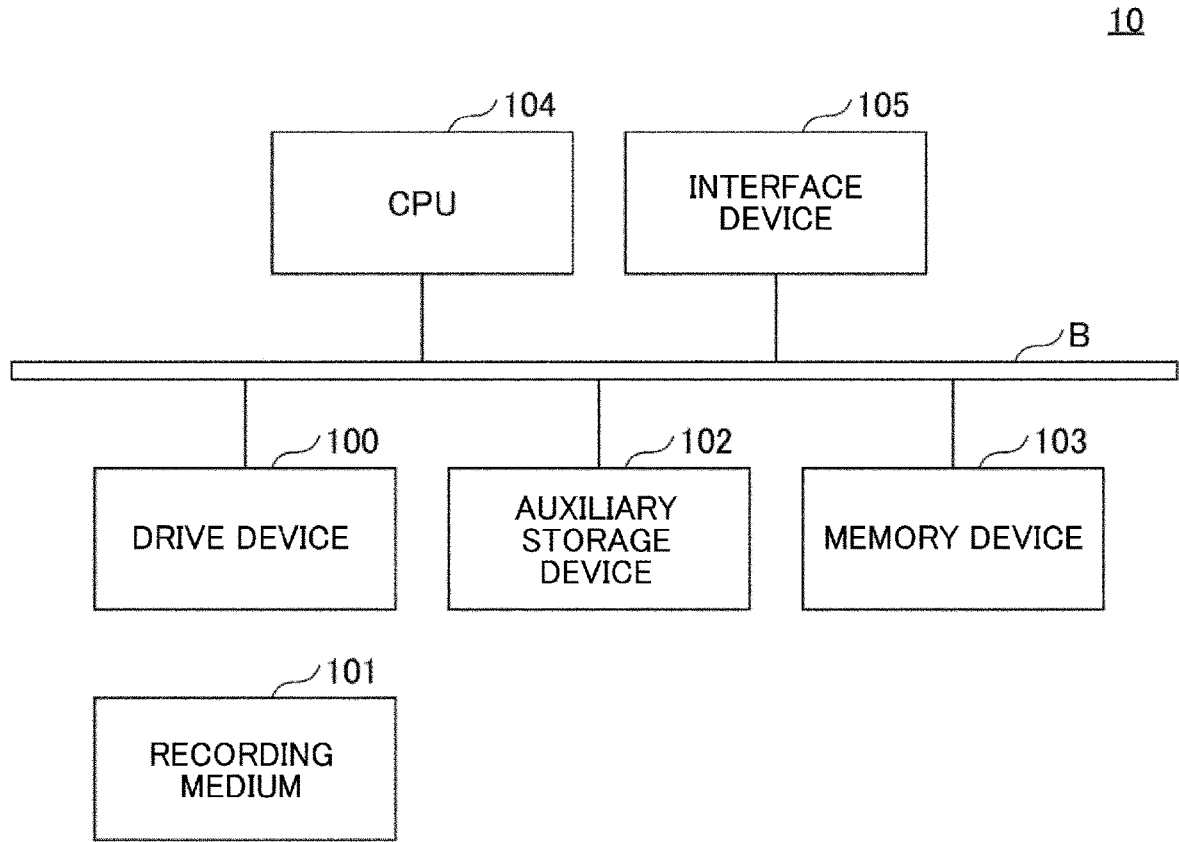
FIG. 3 is a diagram illustrating a hardware configuration example of a control station 10 according to the embodiment of the present invention.

FIG. 3 is a diagram illustrating a hardware configuration example of the control station 10 according to the embodiment of the present invention. The control station 10 in FIG. 3 includes a drive device 100, an auxiliary storage device 102, a memory device 103, a CPU 104, an interface device 105 which are connected with each other via a bus B.

A program implementing processing in the control station 10 is provided by a recording medium 101 such as a CD-ROM. When the recording medium 101 storing the program is set in the drive device 100, the program is installed from the recording medium 101 to the auxiliary storage device 102 via the drive device 100. However, the program does not necessarily have to be installed from the recording medium 101 and may be downloaded from another computer via a network. The auxiliary storage device 102 stores the installed program in addition to necessary files, data, and the like.

The memory device 103 reads and stores the program from the auxiliary storage device 102 when an instruction for starting the program is issued. The CPU 104 executes functions related to the control station 10 according to the program stored in the memory device 103. The interface device 105 is used as an interface for connection to a network.

Figure 4:
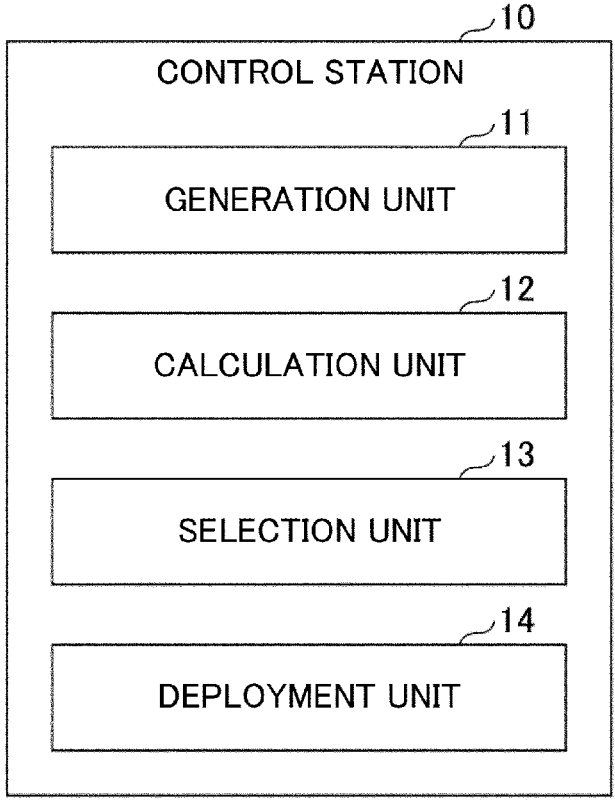
FIG. 4 is a diagram illustrating a functional configuration example of the control station 10 according to a first embodiment.

FIG. 4 is a diagram illustrating a functional configuration example of the control station 10 according to a first embodiment. The control station 10 includes a generation unit 11, a calculation unit 12, a selection unit 13, and a deployment unit 14 in FIG. 4. These units are implemented through processing of the CPU 104 to execute one or more programs installed in the control station 10.

Figure 5:
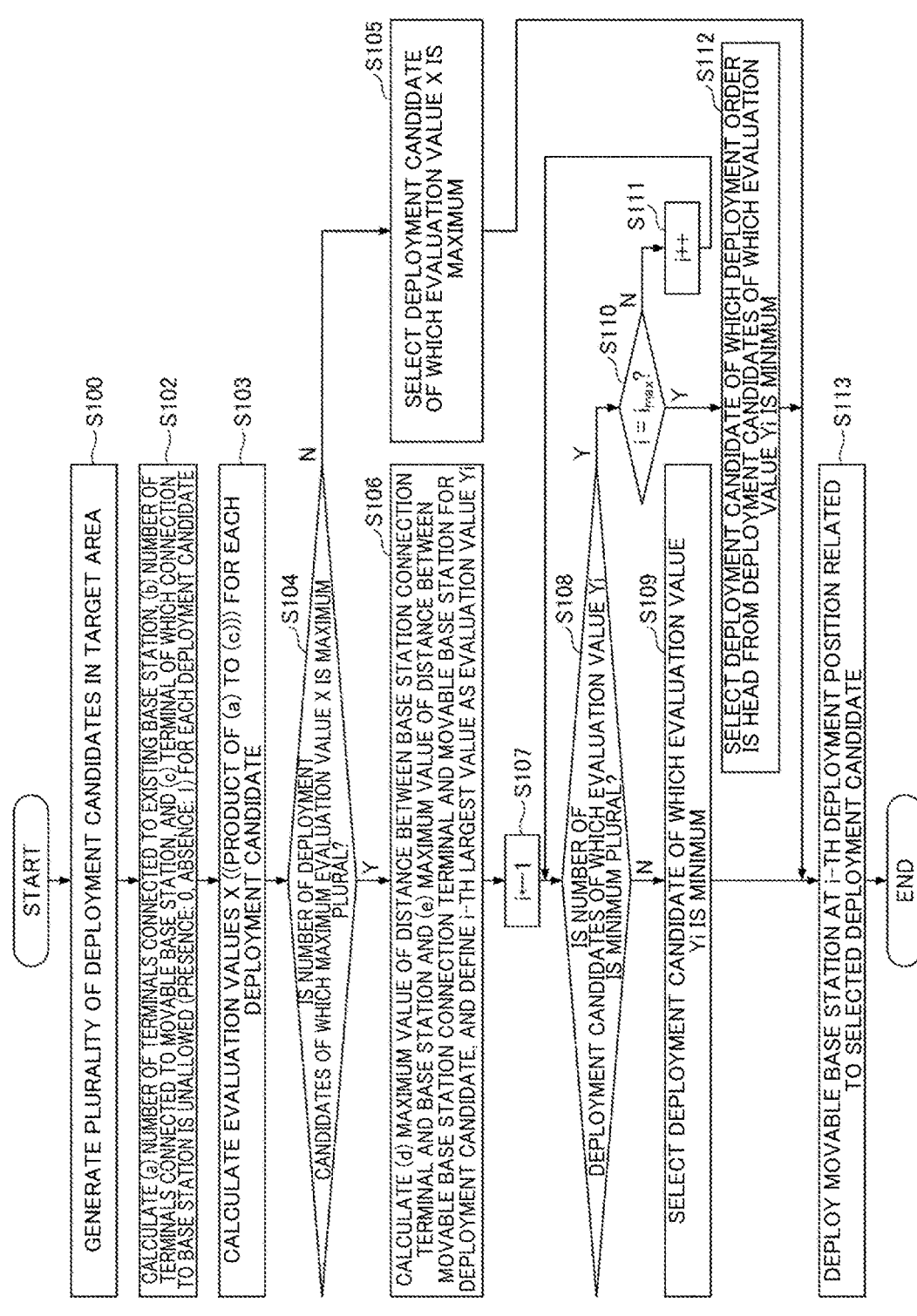
FIG. 5 is a flowchart illustrating an example of a processing procedure performed by the control station 10 according to the first embodiment.

Hereinafter, a processing procedure executed by the control station 10 will be described. FIG. 5 is a flowchart illustrating an example of the processing procedure executed by the control station 10 according to the first embodiment.

In step S100, the generation unit 11 generates (sets) a plurality of candidates (hereinafter referred to as "deployment candidates") for the deployment position of the movable base station 20 in an area where the movable base station 20 is to be deployed (hereinafter referred to as a "target area"). Specifically, the deployment candidate is data indicating a position of the deployment candidate. The position may be expressed by latitude and longitude, or the like or with a relative positional relationship in the target area. The range of the target area may be determined artificially or automatically in advance. Note that, in the first embodiment, it is assumed that there is one existing base station 30 within the target area (hereinafter, the existing base station 30 is referred to as the "target existing base station 30") and one movable base station 20 is deployed (newly installed).

FIG. 6 is a diagram illustrating an example of a deployment candidate. In FIG. 6, the deployment candidates in the target area A are illustrated as circles indicate by broken lines. FIG. 6 also illustrates deployment positions of the target existing base station 30 and each terminal 50. Note that a broken line connecting the existing base station 30 to the terminal 50 indicates a wireless connection relationship between the existing base station 30 and the terminal 50.

Note that the generation unit 11 may generate deployment candidates at equal intervals in the vertical direction and the horizontal direction (for example, the north-south direction and the east-west direction) in the target area A or may generate deployment candidates based on other rules.

Subsequently, the calculation unit 12 calculates an evaluation parameter of each deployment candidate based on the position of each base station (the movable base station 20 and the existing base station 30), the position of each terminal 50 (each terminal 50 connected to the target base station), and the like (S102). In this embodiment, the evaluation parameters include (a) the number of terminals connected to the existing base station, (b) the number of terminals connected to the movable base station, and (c) a terminal for which connection to the base station is unallowed.

(a) The number of connected terminals of the existing base station of a certain deployment candidate is the number of terminals 50 connected to the target existing base station 30 when the movable base station 20 is deployed as the deployment candidate.

(b) The number of terminals connected to the movable base station of a certain deployment candidate is the number of terminals 50 connected to the movable base station 20 when the movable base station 20 is deployed as the deployment candidate.

(c) The terminal for which connection to the base station of a certain deployment candidate is unallowed means a terminal 50 for which connection to both the movable base station 20 and the target existing base station 30 is unallowed when the movable base station 20 is deployed as the deployment candidate. A value of (c) is 0 when there is the terminal 50 corresponding to the terminal for which connection to the base station is unallowed, and 1 when there is no terminal 50 for which connection to the base station is unallowed.

For (a) and (b), the calculation unit 12 calculates reception power in each terminal 50 from the target existing base station 30 and the movable base station 20 based on a distance between each terminal 50, the target existing base station 30 and each movable base station 20, and transmission power of target existing base station 30 and each movable base station 20, and calculates the number of connected terminals for each base station when the terminal 50 is connected to the base station having the largest reception power. In this case, the transmission power of the movable base station 20 may be a predetermined value different from the transmission power of the target existing base station 30 or may be the same value as the transmission power of the target existing base station 30.

As for (c), the calculation unit 12 determines the presence or absence of the terminal 50 in which a maximum value (a maximum value among the reception power from the target existing base station 30 and the reception power from the movable base station 20) after reception power calculated for each base station for each terminal 50 with respect to (a) and (b) is less than a predetermined threshold (required reception power).

Subsequently, the calculation unit 12 calculates the evaluation value X of each deployment candidate based on (a) to (c) (S103). As an example, the product ((a)×(b)×(c)) of (a), (b) and (c) is calculated as the evaluation value X.

FIG. 7 is a diagram illustrating an example of calculation results of evaluation values X for respective deployment candidates according to the first embodiment. FIG. 7 illustrates examples of deployment candidate numbers, values of (a) to (c), and an example of the evaluation values X for the respective deployment candidates. Note that the deployment candidate number is an identification number of each deployment candidate and is associated with the deployment position. However, the deployment candidate number may indicate the position of the deployment candidate.

Subsequently, the selection unit 13 determines whether the number of deployment candidates having the maximum evaluation value X is plural (S104). If the number of deployment candidates having the maximum evaluation value X is one (N in S104), the selection unit 13 selects the deployment candidate (S105) and proceeds to step S113. Note that the deployment candidate having the maximum evaluation value X is a deployment candidate for which a bias is small in the number of connected terminals among the base stations and there is no terminal for which the connection to the base station is unallowed, and the deployment position at which a bias of the terminal connection is small can be specified in the movable base station 20.

On the other hand, if there are a plurality of deployment candidates having the maximum evaluation value X (that is, when the deployment candidate cannot be uniquely selected with the evaluation value X) (Y in S105), the selection unit 13 selects, for each deployment candidate having the maximum evaluation value X, calculates (d) a maximum value of a distance between an existing base station connection terminal and the existing base station, and (e) a maximum value of a distance between a movable base station connection terminal and the movable base station, and defines an i-th (where i=1, 2) value in a descending order of (d) and (e) (that is, an i-th largest value) as an evaluation value Yi of the deployment candidate (S106). Note that the existing base station connection terminal in a certain deployment candidate is a terminal 50 (a terminal 50 of which the reception power from the target existing base station 30 is greater than the reception power from the movable base station 20) connected to the target existing base station 30 when the movable base station 20 is deployed as the deployment candidate. The movable base station connection terminal in a certain deployment candidate is a terminal 50 (a terminal 50 of which reception power from the movable base station 20 is greater than reception power from the target existing base station 30) connected to the movable base station 20 when the movable base station 20 is deployed as the deployment candidate. Accordingly, (d) is a distance between the terminal 50 farthest from the target existing base station 30 and the target existing base station 30 among the terminals 50 connected to the target existing base station 30. (e) is a distance between the movable base station 20 and the terminal 50 farthest from the movable base station 20 among the terminals 50 connected to the movable base station 20.

FIG. 8 is a diagram illustrating an example of calculation results of an evaluation value Yi for each deployment candidate according to the first embodiment. In FIG. 8, for a plurality of deployment candidates having the maximum evaluation value X, (d) a maximum value of the distance between the existing base station connection terminal and the existing base station, (e) a maximum value of the distance between the movable base station connection terminal and the movable base station, and evaluation values Yi (an evaluation value Y1 and evaluation value Y2) are further illustrated. The evaluation value Y1 is a greater value between (d) and (e). The evaluation value Y2 is a smaller value between (d) and (e).

Subsequently, the selection unit 13 substitutes 1 into a variable i (S107). Subsequently, the selection unit 13 determines whether there are a plurality of deployment candidates having the minimum evaluation value Yi (S108). If there is one deployment candidate having the minimum evaluation value Yi (N in S108), the selection unit 13 selects the deployment candidate (S109) and proceeds to step S113.

On the other hand, if there are a plurality of deployment candidates having the minimum evaluation value Yi (Y in S108), the selection unit 13 determines whether the value of the variable i matches $i_{max}$ (S110). $i_{max}$ is a total number (here, 2) of the target existing base station 30 and the movable base station 20. If i does not match $i_{max}$ (N in S110), the selection unit 13 adds 1 to i (S111) and repeats step S108 and the subsequent steps.

If i matches $i_{max}$ (Y in S110), the selection unit 13 selects a deployment candidate of which the deployment order in FIG. 8 is the head (a deployment candidate number is the minimum) among deployment candidates having the minimum evaluation value Yi (S112), and proceeds to step S113. From step S106 and subsequent steps, the deployment candidate of which a maximum distance to the terminal 50 is smaller can be selected. In the example illustrated in FIG. 8, the deployment candidate of which the deployment candidate number is 7 is selected.

In step S113, the deployment unit 14 controls deployment of the movable base station 20 at a deployment position related to the deployment candidate selected in steps S105, S109 or S112. When the movable base station 20 is deployed, a state of the terminals 50 connected to respective base stations is as illustrated in, for example, FIG. 9. In FIG. 9, three terminals 50 are connected to the existing base station 30, and three terminals 50 are connected to the movable base station 20, and none of the base stations are congested (congestion of the existing base station 30 is eliminated).

As described above, according to the embodiment, it is possible to reduce a bias of the number of terminals connected to respective base stations. Thus, an improvement in communication quality can be expected.

Note that, although the example in which one existing base station 30 and one movable base station 20 are provided has been described, the first embodiment may be applied to a case in which a plurality of existing base stations 30 or a plurality of movable base stations 20 are provided. When the number of movable base stations 20 is plural, deployment candidates may be generated for each combination of deployment positions of the plurality of movable base stations 20.

Next, a second embodiment will be described. In the second embodiment, differences from the first embodiment will be described. Points which are not mentioned particularly in the second embodiment may be similar to those of the first embodiment.

In the second embodiment, an example in which the plurality of existing base stations 30 and the plurality of movable base stations 20 are provided (specifically, two existing base stations are provided) will be described. Further, in the second embodiment, by making not only the deployment position of each movable base station 20 but also the transmission power of each movable base station 20 variable, it is possible to search for a combination of the deployment positions and transmission power of the movable base station 20 for which a bias is small in the number of connected terminals.

Figure 10:
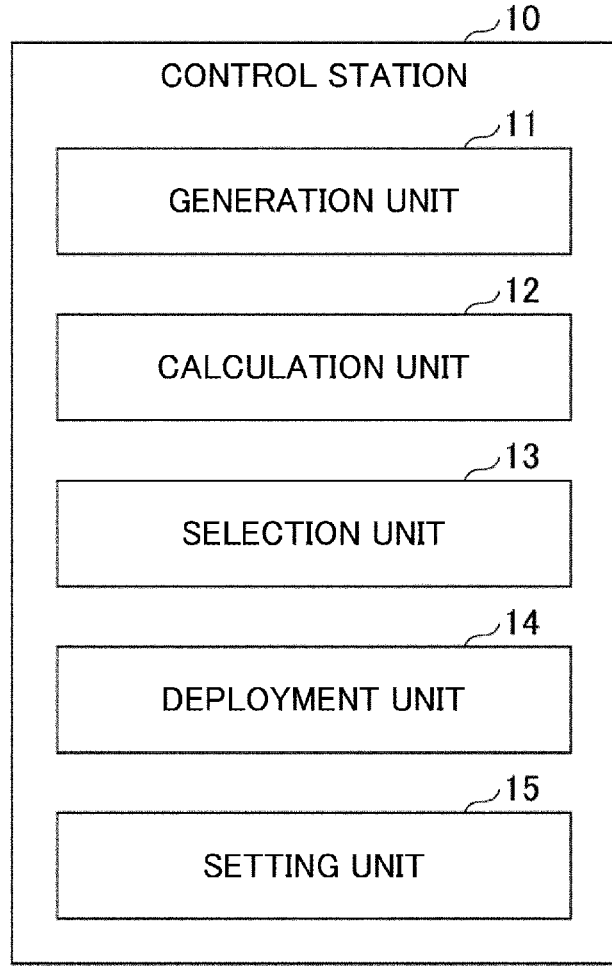
FIG. 10 is a diagram illustrating a functional configuration example of the control station 10 according to a second embodiment.

FIG. 10 is a diagram illustrating a functional configuration example of the control station 10 according to the second embodiment. In FIG. 10, the same parts as those of FIG. 4 or corresponding portions to those in FIG. 4 are denoted by the same reference numerals. In the second embodiment, the control station 10 further includes a setting unit 15. The setting unit 15 is implemented by one or more programs installed in the control station 10 that causes the CPU 104 to execute processing.

FIG. 11 is a flowchart illustrating an example of a processing procedure performed by the control station 10 according to the second embodiment. In FIG. 11, the same steps as those in FIG. 5 are denoted by the same step numbers, and description thereof will be omitted.

In step S100, the generation unit 11 generates a plurality of combinations of a plurality of deployment candidates for each movable base station 20 and a plurality of transmission power adjustment amounts for each movable base station 20 (hereinafter referred to as "candidate patterns") (S101). The transmission power adjustment amount is a reduction amount of relative power from the maximum transmission power. For example, since the transmission power which can be set is different depending on a country, a relative value is set based on the maximum value in the embodiment. However, an absolute value of the transmission power may be used instead of the transmission power adjustment amount.

FIG. 12 is a diagram illustrating an example of a candidate pattern. As illustrated in FIG. 12, one candidate pattern includes a candidate pattern number, a deployment candidate string, and a transmission power adjustment amount string. The candidate pattern number is an identification number of the candidate pattern. The deployment candidate string is a combination of deployment candidates (deployment candidate numbers) for each movable base station 20. For example, the first i of [1, 2] which is a deployment candidate string for the candidate pattern number=1 indicates the deployment candidate number for one movable base station 20, and the second 2 indicates the deployment candidate number for the other movable base station 20. The transmission power adjustment amount string is a combination of transmission power adjustment amounts for each movable base station 20. For example, a first 0 of [0, 0] which is a transmission power adjustment amount string for the candidate pattern number=1 indicates a transmission power adjustment amount for one movable base station 20, and a second 0 indicates a transmission power adjustment amount for the other movable base station 20.

In steps S102 and S103, the calculation unit 12 deploys each movable base station 20 at a deployment position indicated by a deployment candidate string related to the candidate pattern for each candidate pattern and calculates the parameters (a) to (c) when each movable base station 20 outputs transmission power indicated by a transmission power adjustment amount string related to the candidate pattern to calculate the evaluation value X. Note that the calculation unit 12 calculates (a) the number of terminals connected to the existing base station for each existing base station 30. The calculation unit 12 calculates (b) the number of terminals connected to the movable base station for each movable base station 20. Accordingly, in the embodiment, two values are calculated for each of (a) and (b). The evaluation value X is calculated by multiplying all (a), all (b), and (c). Accordingly, the evaluation value X is obtained as one value for each candidate pattern.

FIG. 13 is a diagram illustrating an example of calculation results of evaluation values X for each candidate pattern according to the second embodiment. FIG. 13 illustrates examples of values (a) to (c) and an example of the evaluation value X for each candidate pattern. Note that, of the two values [x, y] in (a), x is a value for one existing base station 30 between the two existing base stations 30, and y is a value for the other existing base station 30 between the two existing base stations 30. Similarly, of the two values [x, y] in (b), x is a value for one movable base station 20 between the two movable base stations 20, and y is a value for the other movable base station 20 between the two movable base stations 20.

If there is one candidate pattern having the maximum evaluation value X (N in S104), the selection unit 13 selects the candidate pattern (8105) and proceeds to step S113a.

On the other hand, if there are a plurality of candidate patterns having the maximum evaluation value X (Y in S105), the selection unit 13 calculates (d) the minimum value of the reception power of the existing base station connection terminal and (e) the minimum value of the reception power of the movable base station connection terminal for each candidate pattern having the maximum evaluation value X, and defines the i-th smallest value of (d) and (e) as the evaluation value Yi (S106a). Note that (d) The minimum value of the reception power of the existing base station connection terminal is a minimum value of power of the reception signal from the existing base station 30 in each existing base station connection terminal. (e) The minimum value of the reception power of the movable base station connection terminal is a minimum value of power of the reception signal from the movable base station 20 in each movable base station connection terminal. Note that the reception power from each base station at the terminal 50 can be calculated based on a distance between each base station and the terminal 50, the transmission power of each base station, and the like.

FIG. 14 is a diagram illustrating an example of a calculation result of an evaluation value Yi for each candidate pattern according to the second embodiment. In FIG. 14, for the candidate pattern having the maximum evaluation value X, (d) the minimum value of the reception power of the existing base station connection terminal, (e) the minimum value of the reception power of the movable base station connection terminal, the evaluation value Y1, and the evaluation value Y2 are further illustrated.

In step S108a, the selection unit 13 determines whether there are a plurality of candidate patterns of which the evaluation value Yi is the maximum. If there is one candidate pattern of which the evaluation value Yi is the maximum (N in S108a), the selection unit 13 selects the candidate pattern (S109a) and proceeds to step S113a.

On the other hand, if there are a plurality of target candidate patterns of which the evaluation value Yi is the maximum (Y in S108a), the selection unit 13 determines whether the value of the variable i matches $i_{max}$ (S110). $i_{max}$ is the total number (here, 4) of the existing base station 30 and the movable base station 20. If i does not match $I_{max}$ (N in S110), the selection unit 13 adds 1 to i (S111), and repeats step S108a and the subsequent steps.

If i matches $i_{max}$ (Y in S110), the selection unit 13 selects a candidate pattern of which the deployment order in FIG. 8 is the head (a candidate pattern number is the minimum) from the candidate patterns of which the evaluation value Yi is the maximum (S112a), and proceeds to step S113a. After step S106a, the candidate pattern of which minimum reception power in the terminal 50 is greater can be selected. According to the example of FIG. 14, the candidate pattern of which a candidate pattern number is 29 is selected.

In step S113a, the deployment unit 14 controls deployment of each movable base station 20 at a deployment position indicated by a deployment candidate string of the candidate pattern selected in steps S105, S109a or S112a.

Subsequently, the setting unit 15 sets the transmission power adjustment amount in the transmission power adjustment amount string of the selected candidate pattern in each movable base station 20 (S114). As a result, a state of the terminals 50 connected to respective base stations is as illustrated in, for example, FIG. 15. In FIG. 15, two terminals 50 are connected to the existing base station 30-1, one nals 50 are connected to the existing base station 30-1, one terminal 50 is connected to the existing base station 30-2, two terminals 50 are connected to the movable base station 20-1, and one terminal 50 is connected to the movable base station 20-2. Thus, none of the base stations are congested.

As described above, according to the second embodiment, it is possible to obtain substantially the same effects as those of the first embodiment.

Note that, when the base station can set different transmission powers between a beacon signal and a data signal, the signal transmission power of the data signal may not be lowered when the transmission power is lowered, but only the transmission power of the beacon signal may be lowered.

In consideration of a communicable area of a backhaul line in which the movable base station 20 is accommodated, the deployment candidates of the movable base station 20 may be limited in advance.

When the movable base station 20 can be adjusted in the height direction, a plurality of deployment candidates for the movable base station 20 may be prepared in the height direction.

The candidate patterns may be further distinguished depending on a case where the movable base station 20 can change a beam transmission direction (a direction of analogue beamforming, a selection of an antenna pattern of digital beamforming, or the like) when the beam transmission direction can be changed.

The above-described embodiments may be applied not only to the movable base station 20 but also to the deployment or the like of fixed base stations. For example, the embodiment may be applied to determination of a deployment position and transmission power of a newly installed fixed base station.

Note that, in each of the foregoing embodiments, the existing base station 30 is an example of a first base station. The movable base station 20 is an example of a second base station. The control station 10 is an example of a base station deployment position selection apparatus.

Although the embodiments of the present invention have been described in detail above, the present invention is not limited to these particular embodiments, and various modifications and changes are possible within the scope of the gist of the present invention described in the claims.

REFERENCE SIGNS LIST

1 Communication system
10 Control station
11 Generation unit
12 Calculation unit
13 Selection unit
14 Deployment unit
15 Setting unit
20 Movable base station
30 Existing base station
40 Relay base station
50 Terminal
100 Drive device
101 Recording medium
102 Auxiliary storage device
103 Memory device
104 CPU
105 Interface device
B Bus

The invention claimed is:
1. A base station deployment position selection method executed by a computer, the method comprising:

calculating, in an area where a first base station to which a plurality of terminals are connected is deployed, for each of a plurality of candidates for a deployment position of a second base station, in a case where the second base station is deployed at the deployment position being a candidate, a number of first terminals connected to the first base station and a number of second terminals connected to the second base station; and selecting one candidate from the plurality of candidates based on the number of first terminals and the number of second terminals, wherein, in the selecting, when the plurality of candidates are selected based on the number of first terminals and the number of second terminals, the one candidate is selected from the plurality of candidates based on a distance between the first base station and a first terminal farthest from the first base station among the first terminals and a distance between the second base station and a second terminal farthest from the second base station among the second terminals for each of the plurality of candidates.

2. A base station deployment position selection apparatus comprising:

a memory; and a processor configured to:

calculate, in an area where a first base station to which a plurality of terminals are connected is deployed, for each of a plurality of candidates for a deployment position of a second base station, in a case where the second base station is deployed at the deployment position being a candidate, a number of first terminals connected to the first base station and a number of second terminals connected to the second base station; and select one candidate from the plurality of candidates based on the number of first terminals and the number of second terminals, wherein the processor is further configured to, when the plurality of candidates are selected based on the number of first terminals and the number of second terminals, select the one candidate from the plurality of candidates based on a distance between the first base station and a first terminal farthest from the first base station among the first terminals and a distance between the second base station and a second terminal farthest from the second base station among the second terminals for each of the plurality of candidates.

3. A non-transitory computer-readable recording medium having computer-readable instructions stored thereon, which, when executed, cause a computer to execute a method, the method comprising:

calculating, in an area where a first base station to which a plurality of terminals are connected is deployed, for each of a plurality of candidates for a deployment position of a second base station, in a case where the second base station is deployed at the deployment position being a candidate, a number of first terminals connected to the first base station and a number of second terminals connected to the second base station; and selecting one candidate from the plurality of candidates based on the number of first terminals and the number of second terminals, wherein, in the selecting, when the plurality of candidates are selected based on the number of first terminals and the number of second terminals, the one candidate is selected from the plurality of candidates based on a distance between the first base station and a first terminal farthest from the first base station among the first terminals and a distance between the second base station and a second terminal farthest from the second base station among the second terminals for each of the plurality of candidates.

* * * * *